United States Patent [19]
Smith

[11] Patent Number: 4,731,842
[45] Date of Patent: Mar. 15, 1988

[54] SECURITY MODULE FOR AN ELECTRONIC FUNDS TRANSFER SYSTEM

[75] Inventor: Peter R. Smith, Alresford, England

[73] Assignee: International Business Machines Corporation, Armonk, N.Y.

[21] Appl. No.: 807,396

[22] Filed: Dec. 10, 1985

[30] Foreign Application Priority Data

Dec. 12, 1984 [GB] United Kingdom ................. 8431381

[51] Int. Cl.⁴ ............................................... H04L 9/00
[52] U.S. Cl. ........................................ 380/24; 380/21; 380/45
[58] Field of Search .......................... 178/22.08, 22.09; 340/825.34; 235/379, 380, 381; 380/23–25, 28, 21, 43, 44, 45

[56] References Cited

U.S. PATENT DOCUMENTS

| | | | |
|---|---|---|---|
| 4,317,957 | 3/1982 | Sendrow | 178/22.08 |
| 4,386,234 | 5/1983 | Ehrsam et al. | 178/22.09 |
| 4,605,820 | 8/1986 | Campbell, Jr. | 178/22.09 |

OTHER PUBLICATIONS

PIN Manual by Interbark Card Association, 1980.

*Primary Examiner*—Salvatore Cangialosi
*Assistant Examiner*—Aaron J. Lewis
*Attorney, Agent, or Firm*—J. Dennis Moore; George E. Clark

[57] ABSTRACT

A security module for use in an electronic funds transfer terminal is contained in a tamper-resistant housing. The module has a PIN pad and is designed to encrypt secret data, such as users personal identity numbers (PINs), so that other terminal processes cannot gain access to it. The encryption functions are carried out in a security controller which includes its own microprocessor and encryption/decryption unit.

7 Claims, 11 Drawing Figures

SECURITY MODULE FOR AN ELECTRONIC FUNDS TRANSFER SYSTEM

BACKGROUND AND PRIOR ART

The present invention relates to a security module for an electronic funds transfer system (EFT), and particularly to such a module that is to be used at a point of sale terminal in an EFT network designed to connect a plurality of disparate retailer's terminals through a switched telecommunications network to a plurality of funds holder's data processing centres.

In an EFT system in which many retailers having separate and different contractual relationships with card issuing funds holders and controllers it is necessary for the point of sale terminal to be able to respond uniquely to the different cards that it receives, and reads, from the card holding users. It is also necessary for the card holders to have confidence in the retailer's terminals and not be concerned that the retailer is trapping secret information, such as personal identification numbers (PINs), for later fraudulent use.

One system that has been proposed to deal with these problems is described in our UK Patent Applications Nos. 83/24916 and 83/24917. This system relies on the use of the so-called smart card in which the security operations, encryption and decryption of PINs etc., are computed in the card holder's personal portable microprocessor mounted in the card. This use of personal portable microprocessors is obviously a very flexible and secure system, but compared with the cost of magnetic stripe cards and considering the numbers involved the cost of the smart card is proving to be a hurdle to its widespread acceptance.

OBJECT OF INVENTION

It is an object of the present invention to provide a technical solution to the problems of terminal flexibility and security confidence for use in an EFT/POS system in which the users have issued cards containing information held on a magnetic stripe and who also have a secret personal identity number, which may, or may not, also be stored on the magnetic stripe.

In broad terms, the present invention provides a technical solution to the problems posed above by including with each retail terminal a tamper-resistant security module. The security module can be physically included in the terminal housing or attached by a short cable through suitable input/output ports. Each module includes a microprocessor that is controlled to perform different message formatting routines depending upon the type and origin of a magnetic stripe card input through a magnetic stripe reader. The module also has incorporated within its structure a PIN pad for a user to enter security information such as a PIN.

According to the invention there is provided a security module, for authenticating messages having a plurality of different formats and cryptographic authenticators, contained in a tamper-proof housing and including two data input devices, a display unit, at least one input/output port for connecting the module to an external processor and a security controller, characterised in that the security controller includes: at least one read only memory which stores a state table and a module master encryption key; a control logic unit including a microprocessor and a control store which stores a plurality of different control function routines invoked by different entries in the state table; function key generation means to generate different encryption keys dependant upon a particular control function and a derivative of the module master key; and means to perform encryption and decryption operations on messages transmitted to and from the module using keys transmitted to the module encrypted under one of a number of derivatives of the module master key, whereby data input to the module at the first of the two data input devices is used to determine the control function routine that the module is to perform and the encryption key used to encode data input at the second data input device.

According to a second aspect of the invention there is also provided a method of using a security module in an electronic funds transfer system terminal to secure secret data from other terminal processes, and in which the security module has a data input device for receiving secret data comprising the steps of: storing in the module a set of master keys each encrypted under a respective function key; transmitting to the security module from a terminal process a function request and a function key; decoding the appropriate master key using the function key; and encoding the secret data using the decoded master key in the security module and transmitting the encoded data to the terminal processes.

PREFERRED EMBODIMENT

In order that the invention may be fully understood a preferred embodiment thereof will now be described with reference to the accompanying drawings in which.

Figure 5:
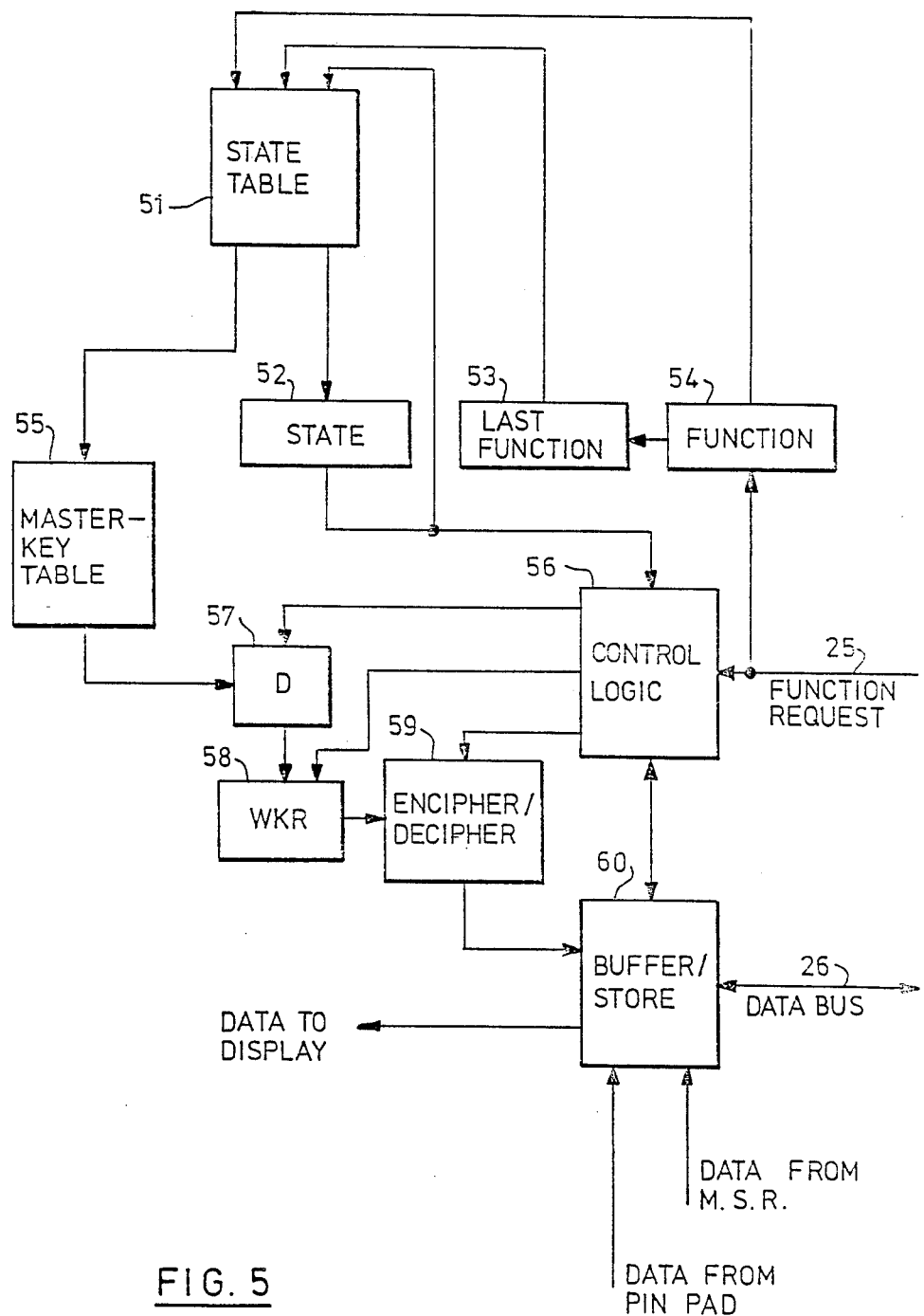
Figure 6:
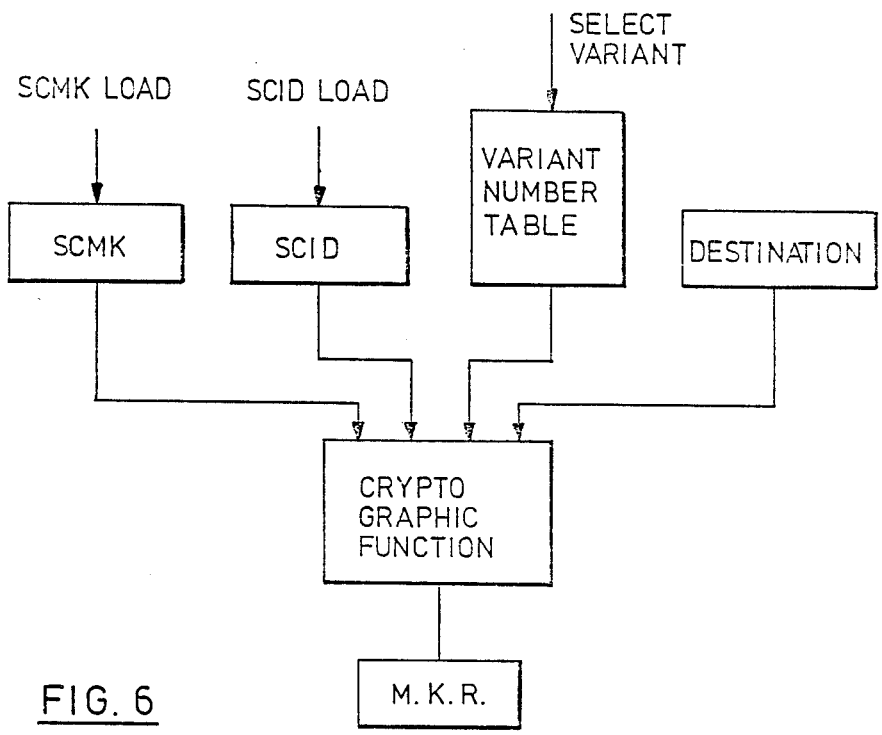
Figure 7:
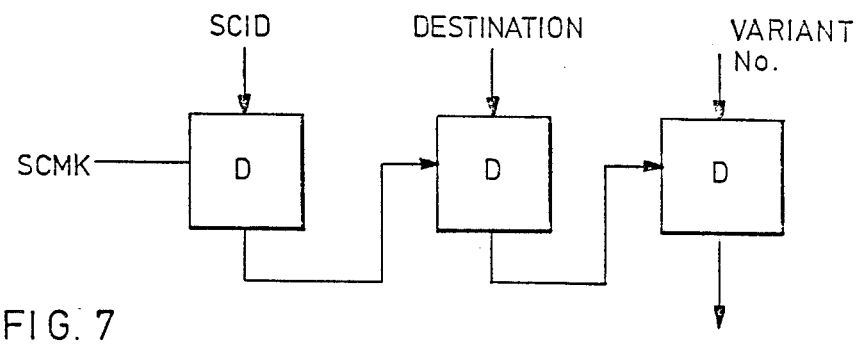
Figure 8:
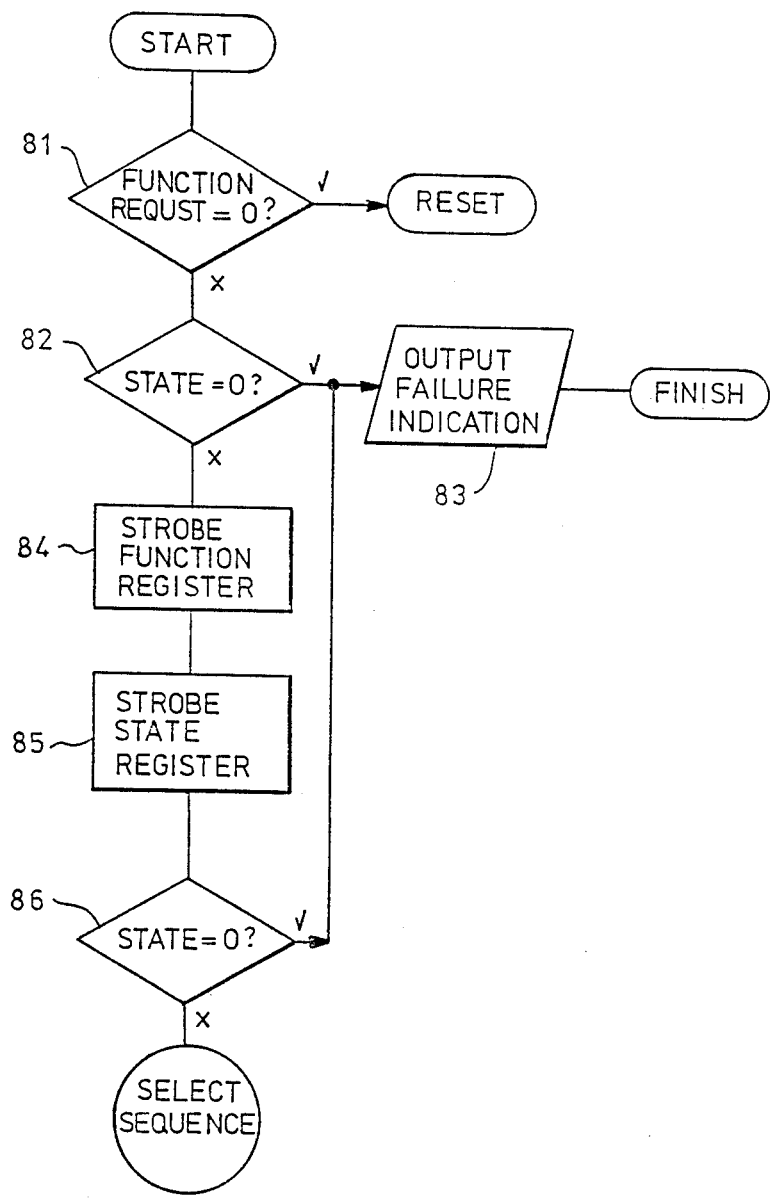

FIGS. 5, 6, and 7 illustrate the construction and methods of operating the security module.

FIGS. 8, 9, 10 and 11 are flow charts illustrating the operation of the security module.

Referring now more particularly to the drawings, in order to provide an understanding of the background of the invention there is initially a general discussion on the design of EFT networks.

There are many possible designs and ways of defining the equipment at the point-of-sale in EFTPOS. Most of the designs can be characterised by the fact that the EFTPOS "terminal" is a complete system, that is, it is a complete add-on to the POS equipment, for the purpose of EFTPOS.

Viewed from the Access Controller (AC) the "terminal" is seen as a system with which the AC has a communications session. In Open System Interface (OSI) terms, the AC and terminal are two systems with one or two networks (Telecommunication local network and the In-Store network).

Figure 1:
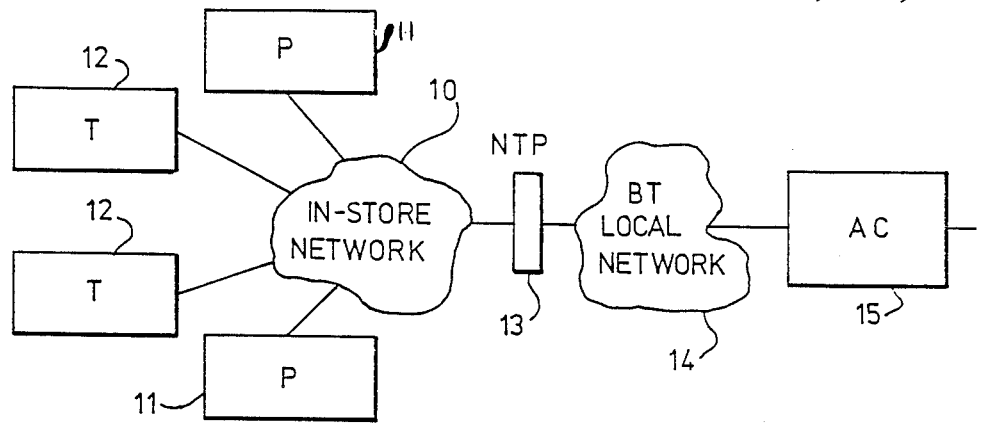
FIG. 1 is a schematic diagram of a portion of an EFT/POS network.

FIG. 1 shows a retailers connection to an EFT network. An instore network 10 has several EFT/POS terminals connected to it. Each unit comprises a retailers point of sale terminal 11 and an associated electronic funds transfer terminal 12. The in-store net 10 is provided to link the terminals 11 and 12 and the combined POS equipment to the local network 14 through a network termination point 13. The local telecommunication network 14 has a connection to an access controller (AC) 15.

The network termination point 13 is the retailers connection point to the local network 13, the "phone jack". The combination of 11 and 12 provide the full facilities necessary to perform EFTPOS transactions.

The EFTPOS "Terminal" in the main will be a distinctive secure unit with a magnetic stripe reader, pinpad, display, security processor and transaction processor. The terminal is responsible for the whole of the transaction, it includes the terminal application control function which performs EFTPOS in conjunction with the AC. It is also necessary for the terminal to support individually managed keys for any card issuer who wants them.

Previously the terminal has been considered to be responsible for the EFTPOS transaction in combination with other retailer equipment such as cashier display for total value input and most, importantly, for communication to the telecommunication network and transaction record printing.

The terminal described below appears similar, but has actually changed significantly. In this view, the EFTPOS "terminal" as seen from the EFTPOS network is an application running in the retailers equipment making use of a security controller in a secure PIN pad (SPP) or security module.

The security module is available to this application to provide an authentication service, its function is to provide a service which allows the card issuer to be satisfied that the correct procedures have been adhered to.

Figure 2:
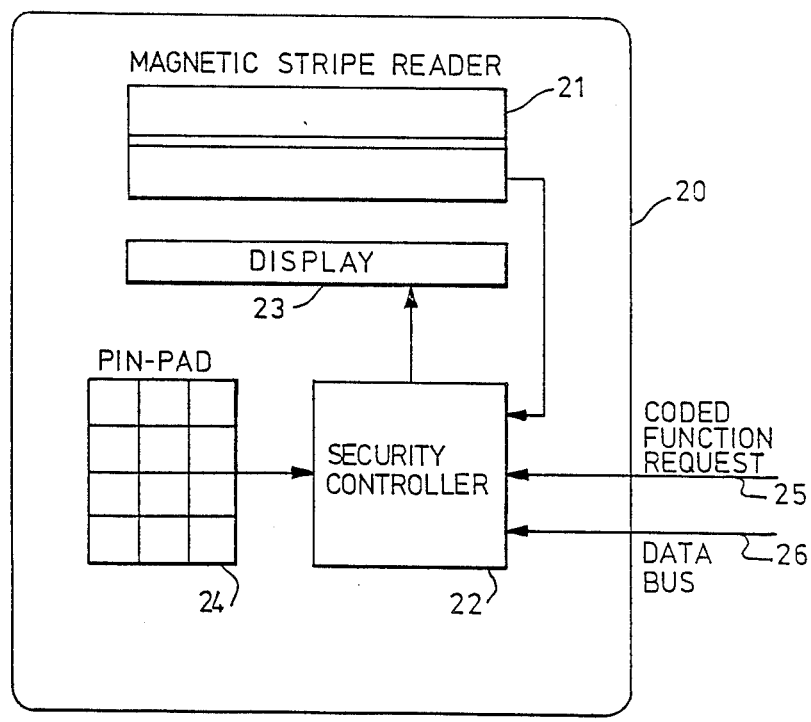
FIG. 2 is a schematic diagram showing the major components of a security module.

The basic component parts of the security module are shown in FIG. 2. The module 20 includes a magnetic stripe reader 21 connected to a security controller 22. A liquid crystal display is also connected to the controller. Typically the display will have two lines of eighteen characters. A pin-pad 24 is connected to the controller and coded function requests are received on a line 25 from an application process running in the main terminal processor. A data bus 26 connects the security controller to the application process which can also have a direct connection to the display.

It may optionally contain a distributed portion of the retailer equipment application running in a processor with memory.

The security controller 22 is the only standard component and must be supplied by an authorised source. It must be connected to the pin-pad 24 and magnetic stripe reader 21 in a manner which satisfies the security requirements of EFTPOS, and the security module must be built to conform to the security and physical standards of EFTPOS.

Within the retailers equipment (optionally within the security module) the terminal system includes a processor (or distributed application on more than one processor). The application supports the management of cryptographic keys and their storage as defined by EFTPOS.

The security controller 22 is a special purpose cryptographic unit. It contains two values—an identification number (SCID) and a master key (SCMK).

The SCID is recorded in the security controller during the manufacture process, the SCMK is installed subsequent to manufacture but prior to first installation onto the network by a secure means specified by EFTPOS. A security controller is regarded as authentic if it produces cryptograms which prove that it contains a valid (SCID, SCMK) pair. The application processor (or processors) will hold keys encrypted under variants of SCMK. The security controller provides a set of functions which will not disclose SCMK. SCMK is held in a secure manner and will be destroyed as a result of any action that might allow SCMK to be discovered.

The identification SCID is not secret, in fact, it may be stamped or written onto the security module to aid the inventory and maintenance processes.

The application may be allowed direct control of the display 23 and the security controller communicates with the application process, via an internal bus. This communication may be extended to a distant processor, or part of the application may be distributed to a processor within the security module, communicating between parts of the system by any suitable means.

---

0 - Reset
1 - Read MSR
    The SC waits for a card to be read, strips out non-transmitted card data (NCD), stores it in a register and sends the transmitted card data (TCD) as a response.
    Possible responses:
        1 - Card read + TCD
        2 - Mis-read
2 - Provide authorisation token
3 - Start message authentication check (MAC) calculation (key provided under variant of SCMK)
4 - MAC input data
5 - Finish MAC calculation - return MAC
6 - Given encrypted CIRN token + key
7 - Check PIN
    Input authentication token + key
    Result indication + confirmation token
    Result = 1 PIN ok, + token
              2 PIN failure
The security controller will refuse to perform this function more than three times, after this it will require a reset.
8 - Give next key
    Input key under variant of SCMK
    Output new key under variant of SCMK

---

The securtiy module contains a record of the function number of the most recent use. It will respond correctly only if the current function request is the next in an allowable sequence.

Failure to conform to the correct sequence will render the security module inactive, a state which can only be changed by a 0—Reset function.

Since the security controller has access to important transaction data, and it generates MAC's, there is a wide range of possibilities for the algorithm for generating next key in function at step 8.

The security scheme may call for the security controller to maintain a synchronised time reference value. If this is the case, then there will need to be a further function to set the time reference and a further key TRK in the security controller to authenticate any value set into a time register (TR). The security controller could return the TR on function 0 (reset), or yet a further function call.

The security module is used by the application in a manner similar to the use of a set of support subroutines. If the application uses the correct sequence of calls (functions) providing the correct data and keys (encrypted under SCMK variants) then the result will be tokens and MAC's which will collectively allow the card issuer host to authenticate the security module, the card and card holder. If incorrectly used, the authentication will fail, and the security module cannot be misused in a manner which will subvert the system without access to considerable amounts of other data and collusion of several parties in different locations.

This removes the following responsibilities, which are normally considered to be functions of an EFTPOS terminal, from the security module:

Transaction management

The security module provides services to allow a remote host to be satisfied that a procedure has been followed. This is achieved because of the existence of tokens (MAC's and cryptograms) which can only be produced by a valid security module, together with secret information, which has been used in a correct manner.

Recovery responsibility

The previously assigned recovery responsibility of the EFTPOS terminal can now be assigned to retailers equipment and applications code.

Key management

The security module need only have one key (or possibly a small number as indicated by a need for down-loaded information such as synchronised time references). This (or these) keys will be installed by a fixed key loading procedure. In EFTPOS this could be a central facility.

Alternative uses of the security module

The security module finds other uses in networks that require cryptographic transmission of information and further examples are now given as they would apply to an EFTPOS network.

First the use of the security module as an authentication device shared by several applications and secondly the extension of the security module by the addition of a 'state variable' which allows its use in alternative and exclusive cryptographic schemes.

(1) Use by Multiple Applications

Figure 3:
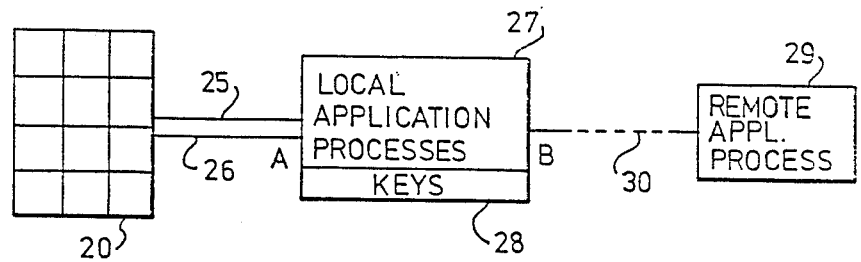
FIG. 3 illustrates the connection between the security module, a POS terminal and a remote application processor.

The partitioning of function is illustrated in FIG. 3 which shows the security module 20 connected over lines 25 and 26 to interface A of a terminal 27 which contains local application processes and at least a set of cryptographic keys 28. The terminal is connected through interface B to a processor of remote application processes 29 through a network route indicated as 30.

Interface B is precisely the network appearance of an EFTPOS terminal. Interface A is used to communicate the data which requests the security module to perform its available functions and to return the results to the application.

Since the function of the security module is to provide data and tokens which allow a remote application to validate the procedures employed at the local site, it follows that one security module can be used by any number of local applications, and in turn any number of remote applications for the similar purposes.

The security module represents a serially re-usable resource. It can only be used successfully for a complete legal sequence by one application at any time.

The keys used by the application process will be held at the local processor encrypted under variants of SCMK, the security module's security controller's master key.

Figure 4:
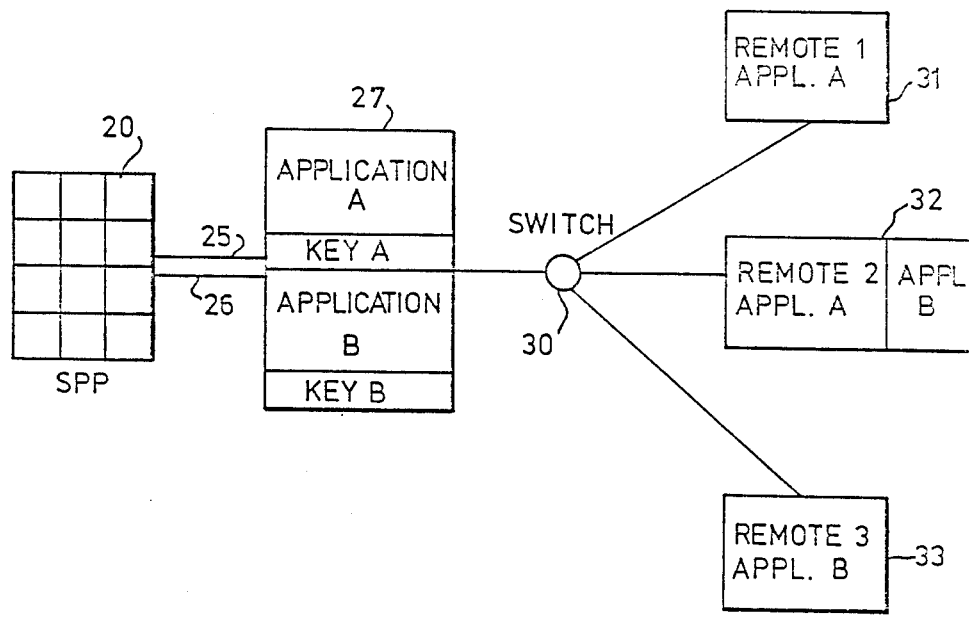
FIG. 4 shows how the security module is shared between two applications.

FIG. 4 shows the security module being made available to two local applications A and B. The security module 20 is connected to a terminal 27 which is running two applications A and B. Three remote processors are shown 31,32 and 33 connected through the switch 30. The security module 20 is used to authenticate procedures and data for the remote hosts 31, 32 and 33 using a combination of applications A and B.

Note: The keys held at the remote hosts will be encrypted under the appropriate host master keys.

(2) Use of Alternative Cryptographic Schemes

The security module as described above is defined as enforcing a single procedure. In particular, it withholds data read from the card (or other means) which will be retained as secret from the local application and any other components between the security module and the remote host. Primarily for use in personal key (KP) cryptography where KP must be constructed using that secret.

To extend this scheme, it is necessary to allow the security module to handle several procedures, i.e., several sequences of function calls. As an example consider the use of the SC in a second scheme which requires that the entire track 2 of the card be transmitted (encrypted).

To achieve this extension, the security module must contain a 'state variable'. This represents the history of the sequence of functions performed since the last reset operation. The sequences now contain points at which the possible next function is one of a set of functions rather than one function, a branch point.

The state of the terminal takes a value depending upon the function requested at any branch point. Thus, the next allowable function is decided by a combination of the last function requested and the value of the state variable. The state variable is updated to represent the new state once the function is requested. As before, any deviation from the prescribed sequence will result in a security module becoming inactive, i.e., the previous description has a single state.

To demonstrate this, consider the list of functions described above.

Following a function 1, the application may decide that the card must be handled without personal key cryptographics. It wishes to read all of track 2. Thus, a new funciton—say 100, may follow function 1.

100—Read all card data. Input KEY encrypted under variant varient of SCMK. Return all of card data (including NCD) encrypted under KEY.

The state variable will take a different value if function 100 follows function 1, than it would if function 2 follows function 1. If the function following 1 is 100 then the security controller will prohibit the use of functions 2, 3, 4, etc. This allows alternative exclusive schemes to be implemented.

In particular, subject to secure design of the functions and states, it allows any schemes to be implemented, including conflicting schemes such as those which require track 2 of a card to be partially secret together with those that require the whole of track 2 to be made available.

Master Key Variants

The use of SCMK variants must be selected, based on the requested function and state variable to enforce partitioned use of security controller functions in the security module in alternative schemes. Thus, each scheme must use selected key variants.

The number of the variant to be used can be selected from a table based on the current state and the requested function. The key used in the operation can be formed by deciphering the selected variant number using SCMK. This means that keys in the application will be held in the following form:

E ( D ( SCMK, variant no.), KEY)

Using the notation E ( key, data) means data enciphered under key and D (key,ciphertext) means the result of deciphering ciphertext using key.

This approach would allow schemes for separation of function by intended destination. Such a scheme is shown in FIGS. 6 and 7. The security controller ID and destination data extracted from the card magnetic stripe track 2 are used to provide a separation of keys.

The security can be enhanced if the key variant is produced by a one-way function in place of the simple decipher operation.

The variant number key is loaded at the same time as the state table (i.e. at manufacture or installation of keys).

This scheme can be further enhanced by selecting further information from a further table to generate the destination information prior to producing the master-key variant as above. This latter table can be down-loaded to the security controller periodically (e.g. at start of day). As with other possible down-loaded information the table load operation requires authentication using additional keys.

Security Module

The internal components of the security module will now be describe with reference to FIGS. 5, 6 and 7. The security controller 22 (FIG. 2) is shown in more detail in FIG. 5 and comprises a state table 51, which in a preferred embodiment is implemented in a read only memory (ROM) chip, the address is formed by concatenating outputs from three registers. The registers are shown separately as State 52, Last Function 53 and Function 54, but in practice are parts of a random access store (RAS).

The state register 52 holds a value which represents the current state of the security controller. The contents of the state register 52 are also available to be tested by the control unit 56. One value of the state register contents, for example zero, is designated to indicate that the unit is inactive following an invalid function request sequence. The control unit only permits a RESET function request when the inactive state is detected. The value in the last function register 53 represents the function performed on the previous cycle of operations of the security module. The value in the function register 54 represents the current function to be performed. The function register 54 receives its input from the application process on line 25 (FIG. 2) and has a direct connection to the last function register 53. The state register 52 receives its input directly from the state table 51.

The output of the state table is split into two fields, one field is entered into the state register and the other is used as the address of a master key table 55. The master key table provides one of a set of master key values to a user key decipher unit 57. The value depends upon the function currently being performed and the values entered into the state table from the three registers. The master key table could be part of the state table ROM but it is preferred that the values are generated as functions of a single key. Embodiments implementing the preferred system are described below with reference to FIGS. 6 and 7.

The operation cycles for each function performed by the security controller are controlled by a control logic unit 56. The control unit interprets the function request and provides the appropriate timing and control signals to route data signals between the other components. The unit comprises a microprocessor and a ROM containing the control routines necessary to provide the required gating and control signals. Each routine is associated with a particular function and will result in a different encoding and decoding operation in the controller.

The user key decipher unit 57 deciphers the user key received from the data bus 26 through a buffer store 60 under the control of unit 56. The decipher key is obtained from the master key table 55. The user key decipher unit implements the decipher function of the Data Encryption Standard (DES).

A working register 58 is loaded with a key produced by the user key decipher unit 57. The working register 58 may also be loaded from the data bus 26 under the control of unit 56 whenever a function routine requires the generation of composite keys, for example a key constructed from card input data, other user data and a variation of the master key. The value loaded into the working register represents a key in the clear and is not transmitted out of the security controller. In order to ensure that the clear key exists for the minimum necessary time, at the end of each cycle the working register is loaded with a string of zeros.

An encryption unit 59 performs the primitive encryption operations needed for the operation of the requested function. This unit implements the DES. The keys for the encryption are received from the working register 58. Output from the encryption unit 59 is fed to a buffer store 60 which temporarily holds all data and intermediate results during the processing required by the requested function.

Figure 9:
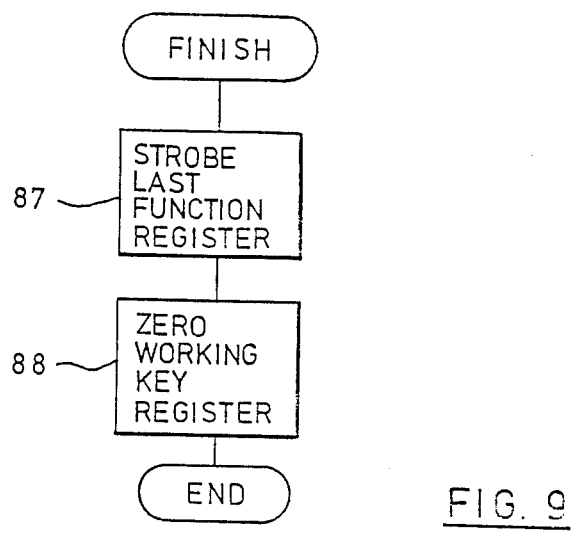
Figure 10:
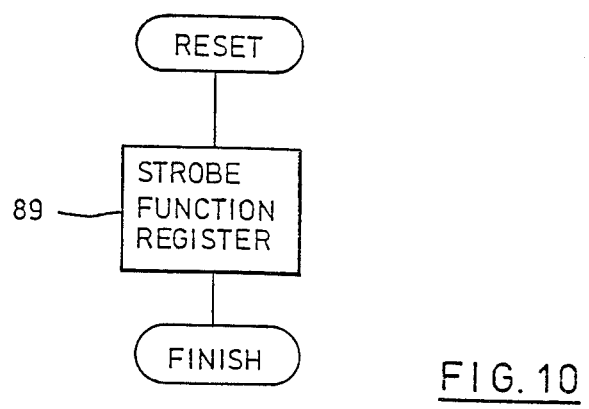
Figure 11:
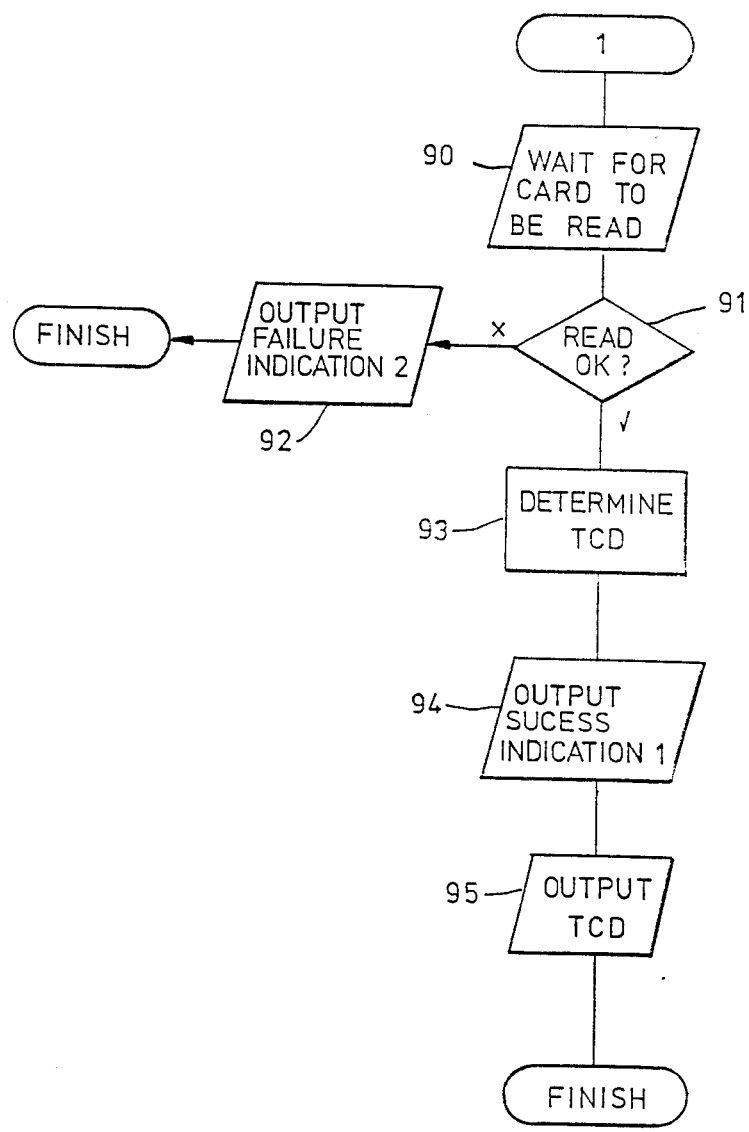

In operation the security controller reads a value representing a function request into the function register 54. Each function is performed by executing a cycle of operations. The cycle consists of standard initial and final sequences of operations with a main sequence selected on the basis of the requested function. The initial and final sequences are illustrated in the flow-charts of FIGS. 8 and 9. The reset function is illustrated in FIG. 10. The sequence for the function for reading the date input at the magnetic stripe readed is illustrated in FIG. 11, this is given as an example of other function sequences that the control unit follows.

In the following description of the operation of the security controller the state register contents will indicate a value of zero when an invalid function sequence is requested, this indicates an inactive state of the module. The steps of the initial sequence (FIG. 8) are:

Step 1 (81): Determine whether the function request = 0, if so go them to the Reset routine (FIG. 10), if not then proceed to next step.
Step 2 (82): Determine whether the value in the state register 52 = 0, if so then go to step 3 (83), if not then proceed to step 4 (84).
Step 3 (83): Provide an output failure indication to the terminal processes and to the display unit. Finish the routine.
Step 4 (84): Strobe the function register.
Step 5 (85): Strobe the state register.
Step 6 (86): Determine whether the value in the state register 52 = 0, if so then go to step 3 (83), if not then proceed to select the sequence indicated by the value in the state register.

The steps of the final sequence (FIG. 9) are as follows:

Step 1 (87): Strobe the last function register to preserve the value of the current function request.
Step 2 (88): Set the working register to all zero contents, to erase the clear version of the encryption key used for the -continued current function. End the function.

The reset function consists of one step (89) and that is to strobe the function register, and then go to the final sequence.

The steps for Function 1 (Read the magnetic stripe reader) are shown in FIG. 11 and are as follows:

Step 1 (90): Wait for a card to be read.
Step 2 (91): Read the card, if the read data is satisfactory then go to step 4, if not then go to step 3.
Step 3 (92): Provide an output failure indication to the terminal processes and to the display unit. Finish the routine.
Step 4 (93): Determine the card data to be transmitted (TCD). For example the TCD may be defined as those digits from card track 2 between start sentinel and field separator.
Step 5 (94): Generate an output indication that the previous step has been carried out successfully and transmit it to the terminal processes.
Step 6 (95): Output the TCD to the terminal on data bus 26,
to then go the final sequence routine (FIG. 9).

This sequence will have a series of sub-routines at step 4 each providing a different set of TCD and chosen on the card issuers identity read at step 2.

Other function routines follow the same general pattern of the sequences described above.

While the invention has been particularly descibed above with respect to the preferred embodiment, it will be realised that modifications and adaptions can be made without depending from the spirit and scope of the invention.

What is claimed is:

1. A security module, for authenticating messages having a plurality of different formats and cryptographic authenticators, contained in a tamper-resistant housing and including two data input devices, a display unit, at least one input/output port for connecting the module to an external processor and a security controller, characterised in that the security controller includes:

at least one read only memory which stores a state table and a module master encryption key;
a control logic unit including a microprocessor and a control store which stores a plurality of different control function routines invoked by different entries in the state table;
function key generation means to generate different encryption keys dependent upon a particular control function and a derivative of the module master key; and
means to perform encryption and decryption operations on messages transmitted to and from the module using keys transmitted to the module encrypted under one of a number of derivatives of the module master key to authenticate said messages; whereby data input to the module at the first of the two data input devices is used to determine the control function routine that the module is to perform and the encryption key used to encode data input at the second data input device.

2. A security module as claimed in claim 1 further characterised in the the security controller includes at least three registers: a function register, a last function register and a state register and that the state table is addressed by using a combination of the current entries in the three registers.

3. A security module as claimed claim 2 further characterised in that the security controller includes a buffer store and data input from the two data input devices are stored in the buffer store before being encoded and in which the first data input device is a magnetic stripe reader and the second data input device is a PIN pad.

4. A security module as claimed in claim 3 including means to detect when an invalid sequence of functions has been requested for the module to perform and to invoke an abort routine when an invalid sequence is detected.

5. A method of using a security module in an electronic funds transfer system terminal to secure secret data from other terminal processes, and in which the security module has a data input device for receiving secret data comprising the steps of:

storing in the module a set of master keys each encrypted under a respective function key;
transmitting to the security module from a terminal process a function request and a function key;
decoding the appropriate master key using the function key; and
encoding the secret data using the decoded master key in the security module and transmitting the encoded data to the terminal processes.

6. A method as claimed in claim 5 in which a single master key is stored in the security module and derivative master keys are generated from the master key using predetermined function request data received from the terminal processes.

7. A method as claimed in claim 6 in which the terminal has at least a second data input device for receiving data from a user and the operable terminal process is dependant data input at the second data input device.

* * * * *